United States Patent [19]

LiDonnici et al.

[11] Patent Number: 4,518,233
[45] Date of Patent: May 21, 1985

[54] AUTOMATIC LAMP CHANGER FOR MODULAR SLIDE PROJECTOR

[75] Inventors: Kenneth LiDonnici; Angelo Dituri, both of Valley Stream, N.Y.

[73] Assignee: General Audio-Visual Inc., Valley Stream, N.Y.

[21] Appl. No.: 564,349

[22] Filed: Dec. 21, 1983

Related U.S. Application Data

[63] Continuation of Ser. No. 459,733, Jan. 20, 1983, abandoned.

[51] Int. Cl.³ .............................................. G03B 21/20
[52] U.S. Cl. ....................................................... 353/87
[58] Field of Search .................................. 353/85–87, 353/119, 52, 57, 61; 362/20, 285, 373

[56] References Cited

U.S. PATENT DOCUMENTS

| | | | |
|---|---|---|---|
| 2,288,345 | 6/1942 | De Vry | 353/61 X |
| 2,529,052 | 11/1950 | Sherwood | 353/52 X |
| 3,270,196 | 8/1966 | Foley | 353/87 X |
| 3,515,476 | 6/1970 | Field | 353/87 |
| 3,733,121 | 5/1973 | Smitzer | 353/87 X |
| 3,914,645 | 10/1975 | LiDonnici | 315/89 |
| 4,094,609 | 6/1978 | Fujii et al. | 353/52 X |
| 4,167,310 | 9/1979 | Persha et al. | 353/61 X |

FOREIGN PATENT DOCUMENTS

| | | | |
|---|---|---|---|
| 2339258 | 2/1975 | Fed. Rep. of Germany | 353/87 |
| 2338832 | 2/1975 | Fed. Rep. of Germany | 353/52 |

OTHER PUBLICATIONS

Publication: Operating Instructions for Kodak "Ektagraphic III, E. S. Projector," Motion Picture & Audiovisual Markets Div., Rochester, N.Y. 14650, 1981.

Primary Examiner—Harry N. Haroian
Attorney, Agent, or Firm—Sprung, Horn, Kramer & Woods

[57] ABSTRACT

A lamp changer for use with a slide projector having a projection lens and a removably modular projection lamp unit insertable through an access door opening. The lamp changer has a housing releasably connectable to the projector at the access opening and a lamp holder for holding at least two projection lamps. The lamp holder is mounted in the housing for pivotable movement about a first axis to successively position each lamp in the lamp holder in direct alignment with the projection lens. Movement of the lamp holder is effected when desired and the new lamp is moved into alignment with the lens and is energized.

2 Claims, 4 Drawing Figures

AUTOMATIC LAMP CHANGER FOR MODULAR SLIDE PROJECTOR

This application is a continuation of application Ser. No. 459,733, filed 1/20/83, now abandoned.

BACKGROUND OF THE INVENTION

The present invention relates to an automatic lamp changer for a slide projector, and more particularly, an automatic lamp changer for use with a slide projector having a modular lamp replacement unit.

Slide projectors have found particular acceptance for use by educators and business people as an excellent means for communicating with audiences. Portable slide projector systems are equipped with synchronized sound and are particularly convenient and versatile to use. Slide projectors generally use a high intensity lamp which directs light through a slide and a lens for projection on a remote screen.

A recognized weak point in slide projectors is in the lamp system. The lamp can fail during a presentation and this means that the projection must be interrupted for a substantial amount of time to allow the hot burned out lamp to cool so that it can be replaced. If a lamp burns out in a display which images are projected by more than one projector onto a single screen, a noticeable blank space will be left on the screen which detracts from the intended visual effect. For unattended operation of slide projectors, it becomes almost imperative to provide automatic lamp changing to prevent loss of the projected image and to eliminate the need for an emergency service call to relamp the projector. Relamping prior to burnout can prove to be a very expensive alternative.

Another problem that plagued conventional projectors, was that the lamp access was only from the bottom of the projector and thus the projector had to be turned upside down to replace the lamp. This required repositioning of the projector after the lamp change, which was particularly inconvenient due to the great deal of time and effort required on the part of the operator to do so.

A new slide projector introduced by Kodak and called the EKTAGRAPHIC III, sought to reduce the aforesaid problems by housing its projection lamp in a module, which is removable from the rear of the projector. The module housing the lamp is accessed by opening an access door at the rear of the projector and pulling the module out. Unless one has a complete replacement module, there is still the disadvantage that the operator must wait until the bulb cools down in order to replace it with a new bulb.

Thus, while the need to turn the projector upside down upon burn-out of the lamp is eliminated, the delays associated with changing the burned out bulb still exists.

One way in which the problem of lamp burn out was overcome in the past, was with the provision of an automatic lamp changer with multiple lamps such as the ones disclosed in U.S. Pat. Nos. 3,914,645 and 4,061,911. However, these units are not compatible with the new Kodak EKTAGRAPHIC III modular projector.

SUMMARY OF THE INVENTION

The main object of the present invention is to provide an automatic lamp changer for this new modular projector and in particular an automatic lamp changer which can be connected to the projector merely by the removal of the original lamp module and without having to modify or otherwise prevent the user of the slide projector from bringing it back to its original condition by simply reinserting the original equipment lamp module.

Another object of the present invention is to provide the automatic lamp changer with at least two lamps and preferably three or more lamps which automatically replace a burned out lamp without the need for interrupting the use of the slide projector.

A further object of the present invention is to configure the automatic lamp changer so that it is no higher or wider than the projector itself. These features are important when projectors are ganged up side by side and above and below each other since the closer each projector can be to another aiming at the same point on the screen, the less distortion of the images there is relative to one another. Moreover, by configuring the automatic lamp changer as set forth hereinbefore, the projector with the lamp changer connected thereto can be used in the same space or on the same mounting plates which have been previously designed for use with only the projector alone.

Another key feature of the present invention is that the lamp changing unit is designed to interface with the already existing cooling air vent at the rear of the projector so that cooling air from the projector is trapped and directed over the lamp in the lamp changing unit which is in the energized or operating position.

The electrical control of the lamp changer according to the present invention is equivalent to that used in prior U.S. Pat. No. 3,914,645 and is incorporated herein by reference. In that aforementioned device, a photocell senses when there is less light than is proper for a given input voltage to the lamp and signals to an electric circuit to energize a solenoid. This solenoid releases a linkage which is holding back a spring loaded lamp holding sector, on which are mounted three lamps in the embodiment according to the present invention as illustrated hereinafter. This causes the sector to rotate to within a short distance of the next lamp position. After a few seconds time delay, during which time the lamp filament stops vibrating due to the impact, the solenoid is deactuated and the linkage permits the sector to advance the last distance to the next position, simultaneously voltage is applied to light the lamp.

In the original equipment lamp module, the light is first reflected off a mirror and then through a heat filter and a condenser lens. In accordance with the present invention, the mirror is eliminated since the lamp is situated directly on the optical axis and therefore that loss of light energy inevitably associated with the use of a mirror is eliminated.

In fact, in accordance with the present invention, a tunnel is disposed between the lamp in the operating position and the projector to reduce the temperature at the slide. Its proximity to the lamp mounting disk is effective in preventing migration of the hot air into the slide area and does not attenuate the light output as would a heat resistant window.

In order to make the lamp changer interface with the already existing projector without any modification, a further provision is made for a locking mechanism which connects to the access door lock already provided on the projector. The lock on the automatic lamp changer clamps the module into the correct position and allows it to be retained in place during use.

Moreover, the lamp changing unit has a rear access door which is removable and thus allows one to change the lamps without removing the automatic lamp changer from the projector.

These and other objects and advantages of the present invention will become more apparent from a consideration of the following detailed description taken in conjunction with the accompanying drawings, wherein:

DETAILED DESCRIPTION OF THE INVENTION

Figure 1:
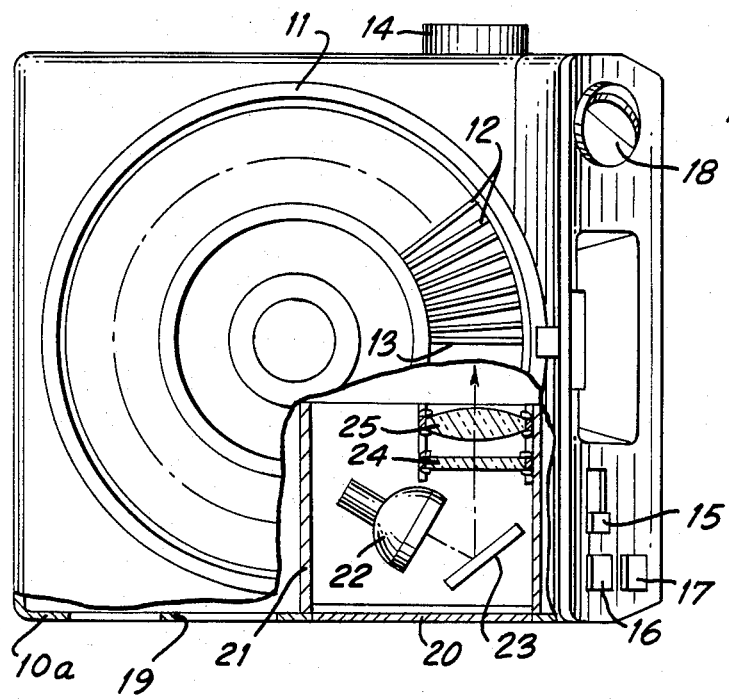
FIG. 1 is a partial sectional top view of the known projector to which the present invention is connected during use.
Figure 2:
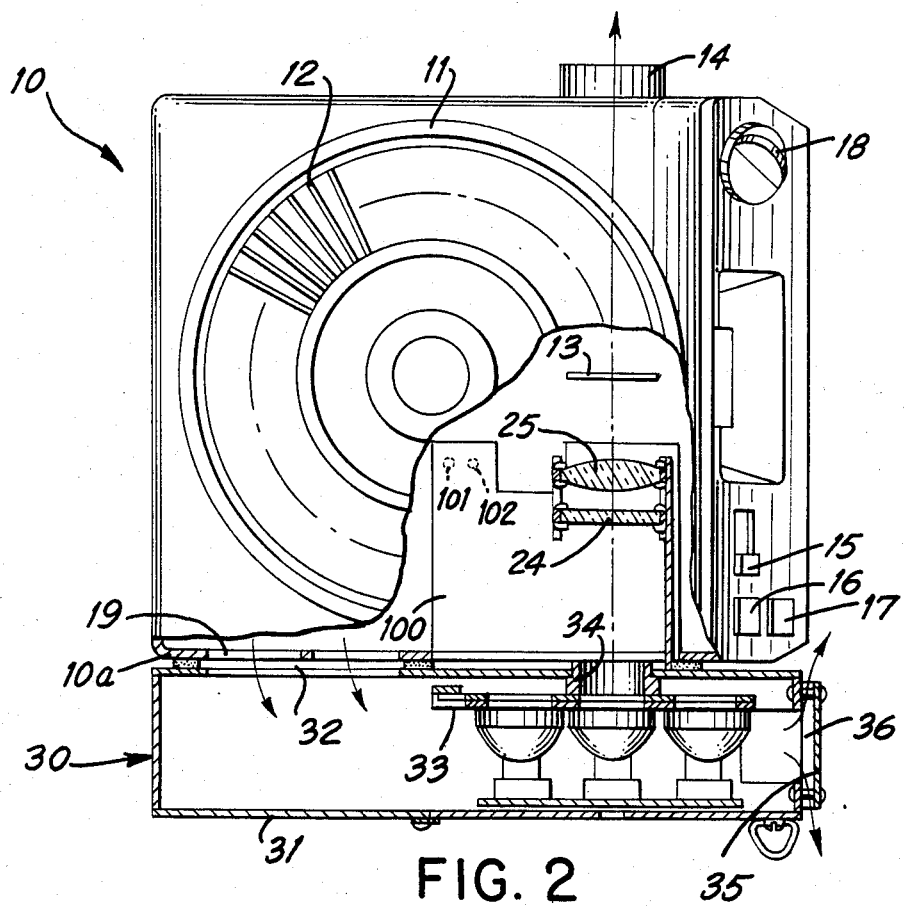
FIG. 2 is a partial section top view of the present invention connected to the projector of FIG. 1.

Referring now to FIGS. 1 and 2, the already existing slide projector 10, in particular the Kodak EKTAGRAPHIC III includes the carousel 11 holding slides 12. The slide projector, the details of which are incorporated by reference herein, has suitable controls such as the focusing knob 18 for lens 14, on-off power switch 15, forward button 16 and reverse button 17.

Along one side 10a of the projector 10 is disposed the cooling air vent 19 as well as access door 20 for a space internal of the projector 10 wherein a lamp module 21 is received. The lamp module 21 houses a projection lamp 22, the light from which is reflected off mirror 23 and thereafter through heat glass 24 and condensing lens 25 so that the image contained on slide 13 in the position shown will pass through projection lens 14 and appear on a remotely positioned screen.

In accordance with the present invention, the lamp module 21 is removed from the projector and in its place, the automatic lamp changing unit 30 is provided which includes a housing 31 having an air passage 32 therein for receiving the air through the vent 19 of the projector, an automatic lamp changing unit 33 which has one of the three lamps therein positioned on the light path of the originally existing module 21 so that the light therefrom passes directly through the slide and to the lens 14. In order to isolate the lamp heated air, a tunnel made of a suitable metal tube 34 is provided which abuts against the lamp unit 33 as shown, while not restricting the passage of light.

The unit also comprises the insertable portion 100 which is received in the space in projector 10 normally taken by module 21. The portion 100 includes bracket members 103, 104 (see FIG. 3) for holding a replacement lens 25 and heat glass 24 as well as power pins 101, 102, referred to hereinafter.

As a result of the positioning of each lamp in an operating position as shown, there is no mirror needed in the optical path.

The automatic lamp changer 30 is also provided with means for connecting to the access door lock of the projector so that no modification need be made to the projector 10 in order to operate with the automatic lamp changer 30 and therefore the projector 10 can be brought back to normal by merely disconnecting the automatic lamp changer 30 and reinserting the module 21.

The lamp changer also includes a vent opening 36 for venting the cooling air from the fan of the projector. Baffle 35 prevents excessive light leaks from the automatic lamp changer while permitting the excape of hot air.

Moreover, the electrical connection to the automatic lamp changer 30 can be obtained from the connector pins 101, 102 (FIG. 3) which engage the existing projector connector normally used to connect power to the module 21, to provide all of the power for lamp changer 30.

Figure 3:
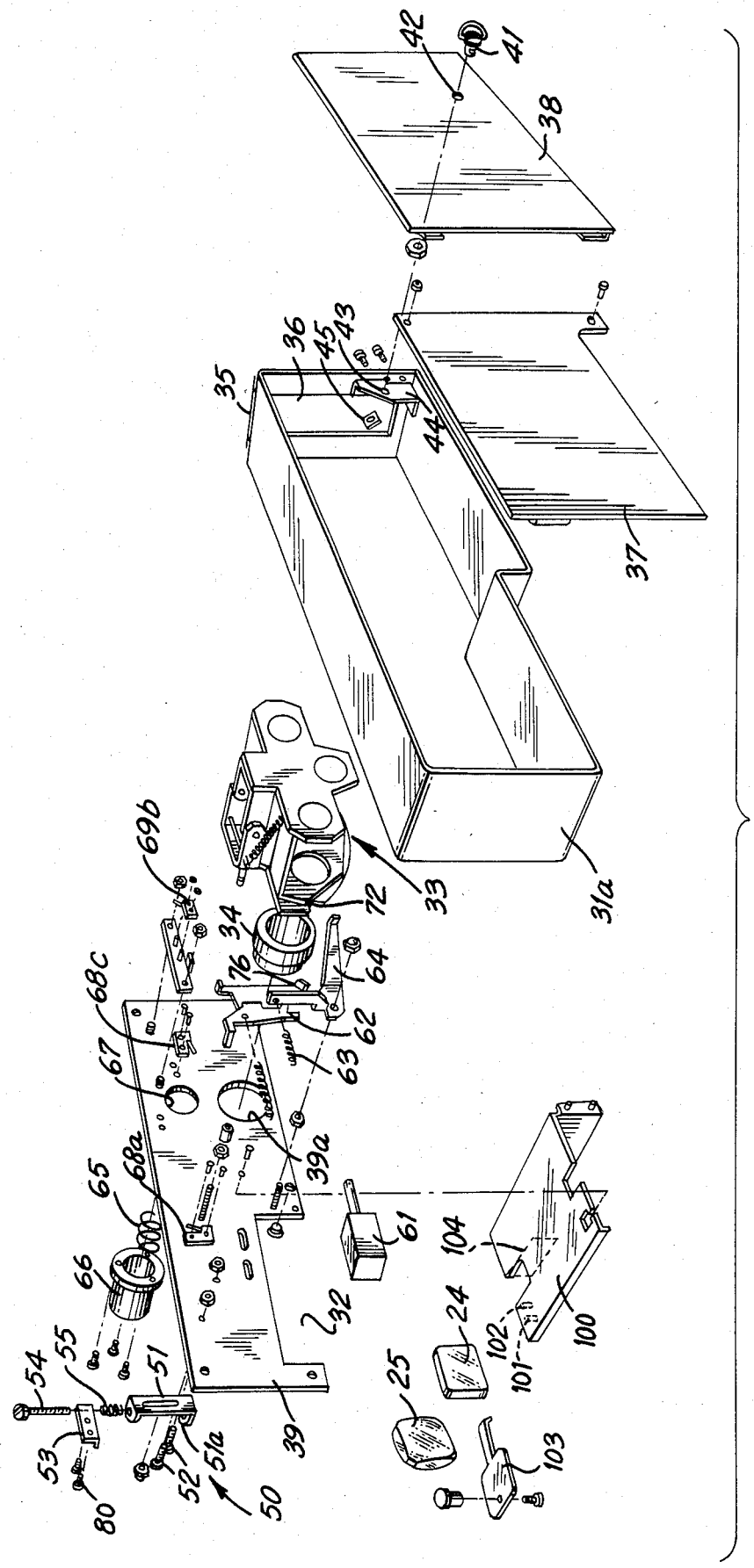
FIG. 3 is an exploded view of the present invention.

Referring now to FIG. 3, the automatic lamp changer is shown with its important elements in an exploded form.

The housing 31 includes the frame 31a to which a front plate 39 is connected which has the cut-out 32 for the cooling air from the vent 19 as well as the circular opening 39a in the light path for receiving the tunnel 34.

The housing also includes the back plates 37 and 38. The back plate 37 is used to mount electrical components (not shown) and is mounted onto frame 31 by conventional screw connection. Plate 38 is connected by an easily removable releasable mechanism in order to facilitate the access to the lamp mount 33 when lamps have been burned out and need to be replaced and includes locking key 41 which passes through aperture 42 and aperture 43 in bracket 44 connected to frame 31a and which engages a locking clip 45 mounted thereon in a conventional manner. In this way the cover plate 38 is easily removable without the need for any tools.

In order to enable the automatic lamp changer to be connected in place with the projector, the lock mechanism 50 is provided. This lock mechanism is configured to engage with the access door lock on the projector so that the automatic lamp changer will be reproducibly clamped in place each time. The locking means 50 includes lock member 53 which is bolted to the front plate 39 by suitable screw fasteners 80. The clamping effect is carried out by member 51 which is slidably mounted to plate 39 biased downwardly by spring 55 and pulled upwardly into the locking position by screw 54. The locking means 50 engages the access door lock by means of the lip 51a.

The remaining hardware shown in FIG. 3 constitutes the mounting for the lamp mount 33 as well as the linkage and electrical elements needed in order to effect a lamp changing when desired.

In accordance with U.S. Pat. No. 3,914,645, the lamp mount 33, although different from the lamp mount construction shown therein, is controlled in a similar manner and by similar circuitry and switching elements. A photocell (not shown) senses when there is less light than is proper for a given input voltage for the lamp in the operating position. The signal from the photocell is sensed by an electronic circuit such as that used in the aforesaid U.S. patent for producing a signal which energizes solenoid 61. Solenoid 61 releases linkage 62 which is biased by spring 63 and allows the lamp mount 33 to turn. The lamp mount turns as a result of the torsion spring mounting which includes torsion spring 65 and torsion spring holder 66 which is mounted in aperture 67 of the front plate 39. The mounting of the spring is similar to that shown in the aforesaid '645 patent. The sector thereby rotates to within a very short distance of the next lamp position at which point link 64 engages detents 71 or 72 (see FIG. 4). After a few seconds time during which the filament of the lamp now approaching the operating position stops vibrating, the solenoid 61 is deactuated causing link 62 to reengage the detent 72 prior to link 64 being drawn out of engagement with detent 71, thereby permitting lamp mount 33 to reach the final advanced position of the lamp mount sector. The switches 68a–c provide energization to the proper one of the three lamps and deenergize the others.

Figure 4:
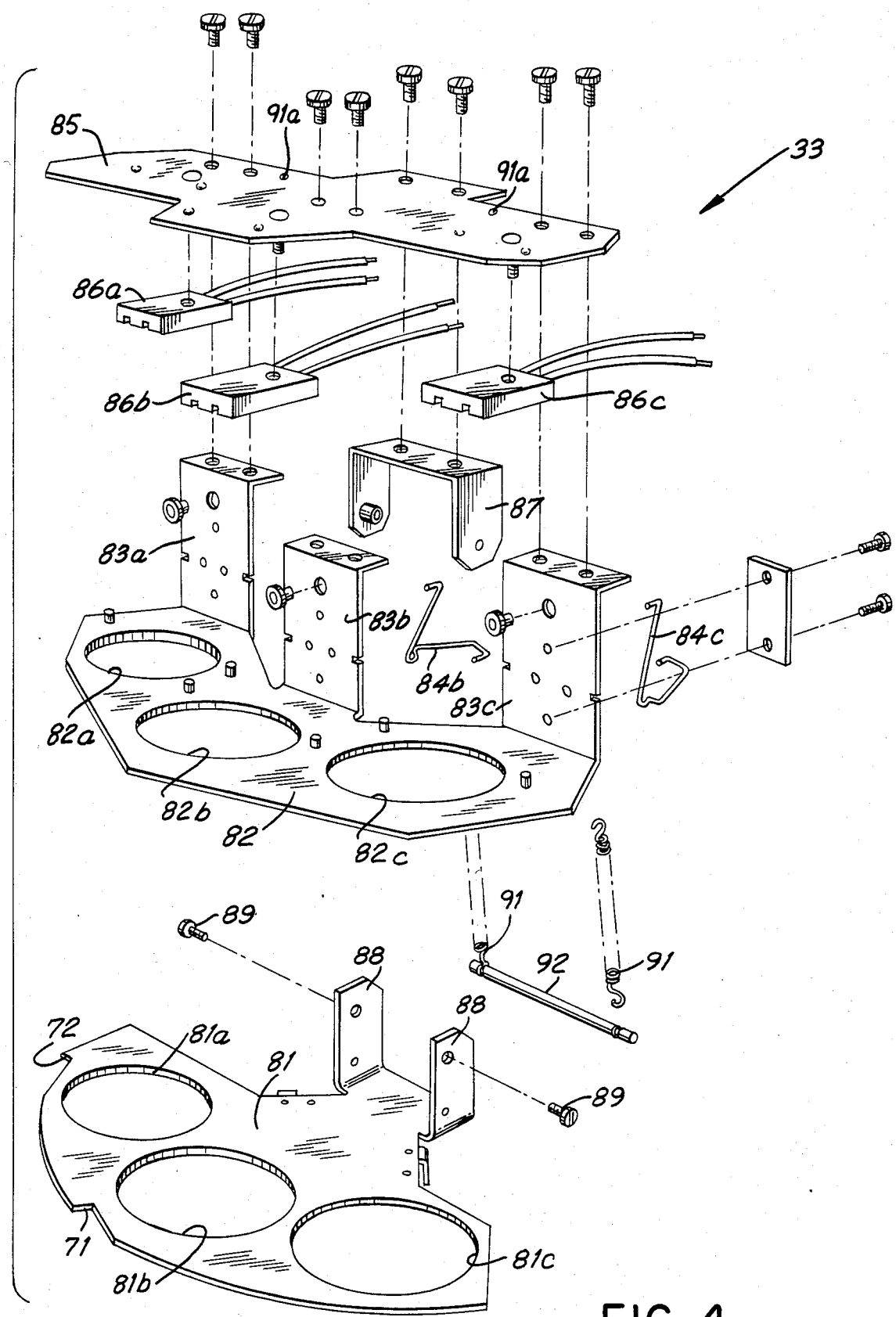
FIG. 4 is an exploded view of the lamp mount shown in FIG. 3.

FIG. 4 shows the lamp mount 33 in exploded form and comprises the lamp disk 81 having apertures 81a–81c which abut against tunnel 34, lamp holder 82 which has the equivalent three apertures 82a–82c and corresponding lamp mounting portions 83a–83c which hold lamp clips 84a–84c of which only 84b and *c* are shown and to which also is connected the top plate 85 which holds lamp sockets 86a–86c. By means of hinging element 87 which is pivotally mounted on ears 88 of disk 81 by screws 89, the plates 82 and 85 may be pivoted rearwardly to expose the lamps for removal. Over-center springs 91, engaged by pin 92 and hooked in holes 91a in top plate 85 hold lamp holder 82 firmly in its operating position or, during lamp replacement, in its open position.

It will be appreciated that the instant specification and claims are set forth by way of illustration and not limitation, and that various modifications and changes may be made without departing from the spirit and scope of the present invention.

What is claimed is:

1. A lamp changer for use with a slide projector having a projection lens and a removable modular projection lamp unit insertable through an access opening, the lamp changer replacing said modular projection lamp unit during use, said lamp changer comprising:
   a housing;
   means for releasably connecting the housing to the projector at the access opening;
   lamp holding means for holding at least two projection lamps;
   means mounting the lamp holding means in the housing for pivotable movement about a first axis to successively position each lamp in the lamp holding means in direct alignment with the projection lens;
   means for effecting movement of the lamp holding means when desired and for energizing the new lamp moved into alignment with the lens; and a cylindrical tunnel aligned with the lens and abutting the lamp holding means and extending through the housing to isolate air heated by an energized lamp, said tunnel stationarily connected to said housing.

2. A lamp changer for use with a slide projector having a projection lens and a removable modular projection lamp unit insertable through an access opening, the lamp changer replacing said modular projection lamp unit during use, said lamp changer comprising:
   a housing;
   means for releasably connecting the housing to the projector at the access opening;
   lamp holding means for holding at least two projection lamps;
   means mounting the lamp holding means in the housing for pivotable movement about a first axis to successively position each lamp in the lamp holding means in direct alignment with the projection lens;
   means for effecting movement of the lamp holding means when desired and for energizing the new lamp moved into alignment with the lens, the lamp holding means including means hingedly mounting the lamp holding means for movement about an axis perpendicular to the first axis to enable replacement of the lamps held therein.

* * * * *